(12) United States Patent
Bennett

(10) Patent No.: US 6,233,799 B1
(45) Date of Patent: May 22, 2001

(54) CYLINDER SIZER AND METHOD THEREOF

(76) Inventor: Ronald B. Bennett, 3664 Pheasant Run, Bloomfield Hills, MI (US) 48302

( * ) Notice: Subject to any disclaimer, the term of this patent is extended or adjusted under 35 U.S.C. 154(b) by 0 days.

(21) Appl. No.: 09/491,832

(22) Filed: Jan. 26, 2000

(51) Int. Cl.[7] .................. F42B 33/00; F42B 33/02
(52) U.S. Cl. .................. 29/1.1; 29/1.1; 29/1.22; 408/72 R; 408/72 B; 408/115 R; 408/115 B
(58) Field of Search .................. 29/1.1, 1.22; 86/22, 86/29, 43, 31, 23, 24; 102/430; 42/2, 14, 59, 77, 69.02; 408/100, 72 R, 72 B, 115 R, 115 B

(56) References Cited

U.S. PATENT DOCUMENTS

| | | | |
|---|---|---|---|
| Re. 34,612 | * 5/1994 | Bender et al. | 86/27 |
| 2,019,795 | * 11/1935 | Peterson | 29/1.22 |
| 2,299,747 | * 10/1942 | Harter | 29/1.1 |
| 2,718,708 | 9/1955 | Kalberer | 33/579 |
| 2,864,268 | 12/1958 | Anderson | 408/79 |
| 3,543,429 | 12/1970 | Bendele et al. | 42/77 |
| 3,602,935 | 9/1971 | McDonnell et al. | 42/95 |
| 3,736,835 | * 6/1973 | Hanson | 86/19 |
| 4,020,736 | * 5/1977 | Petersen | 86/29 |
| 4,321,737 | 3/1982 | McIntyre | 29/1.1 |
| 4,389,790 | * 6/1983 | Dunlap | 408/115 R |
| 4,455,777 | 6/1984 | Callies | 42/59 |
| 4,461,603 | 7/1984 | Klee et al. | 408/115 R |
| 4,521,140 | * 6/1985 | Doescher et al. | 408/72 R |
| 4,723,472 | * 2/1988 | Lee | 86/24 |
| 4,871,285 | 10/1989 | Moore | 408/80 |
| 5,733,077 | 3/1998 | MacIntosh, Jr. | 408/103 |
| 5,885,298 | * 3/1999 | Herrington et al. | 606/88 |
| 6,010,440 | 1/2000 | Miyano | 483/1 |
| 6,101,915 | * 8/2000 | Sinclair | 86/24 |

* cited by examiner

Primary Examiner—Michael J. Carone
Assistant Examiner—Lulit Semunegus
(74) Attorney, Agent, or Firm—Bliss McGlynn, P.C.

(57) ABSTRACT

A cylinder sizer and method includes a base, a slide cooperating with the base and movable relative thereto and a lock fastener to extend through a central aperture of a cylinder for a gun and engaging the slide. The cylinder sizer also includes an alignment member to extend through a chamber of the cylinder and operatively engaging the base for aligning the cylinder relative to the base. The cylinder sizer further includes a cutting tool to extend into the chamber of the cylinder and operatively engaging the base for enlarging at least a portion of the chamber of the cylinder.

20 Claims, 2 Drawing Sheets

CYLINDER SIZER AND METHOD THEREOF

BACKGROUND OF THE INVENTION

1. Field of the Invention

The present invention relates generally to cylinders for guns and, more particularly, to a cylinder sizer and method of enlarging at least a portion of a chamber of a cylinder for a gun.

2. Description of the Related Art

It is known to provide cylinders for guns. Typically, the cylinder includes a central aperture extending therethrough and a first mounting portion surrounding the central aperture at one axial end and a second mounting portion surrounding the central aperture at the other axial end thereof for allowing the cylinder to be mounted to the gun. The cylinder also includes a plurality of chambers disposed circumferentially about the central aperture and extending axially therethrough to receive a cartridge of a standard size.

Typically, each chamber has a rim portion at one axial end adjacent a breach side of the gun and a throat portion at the other end adjacent a muzzle side of the gun. The throat portion tapers axially and radially inward to reduce the diameter of the chamber. The cartridge has a cartridge case with a rim disposed in the rim portion and extending into the chamber and a bullet at the end of the cartridge case disposed adjacent the throat portion. When the cartridge is discharged, the bullet travels through the throat portion of the chamber into a barrel of the gun. In the barrel, the bullet travels through a forcing cone and engages riffling in the barrel to exit the gun on a true plane.

Although cartridges are manufactured in standard sizes, some gun operators use outdated, non-standard or "special" cartridges for shooting. These cartridges typically have a bullet with a diameter slightly larger than the diameter of the throat portion of the chambers. When the cartridge is fired, the bullet enters the throat portion, which shaves or removes material from the bullet, distorting the travel of the bullet through the forcing cone and barrel, resulting in inaccurate travel. As a result, it is necessary to enlarge the diameter of the throat portion of the chambers. However, the throat portion of the chambers must be enlarged in an accurate manner of else the bullets of the cartridges will not exit the barrel on a true plane.

It is desirable to provide a cylinder sizer to enlarge at least a portion of the chambers of a cylinder for a gun. It is also desirable to enlarge either all or a portion of chambers of a cylinder for a gun in an accurate or true manner. It is further desirable to provide a method for enlarging at least a portion of chambers of a cylinder for a gun to a desired size.

SUMMARY OF THE INVENTION

It is, therefore, one object of the present invention to provide a cylinder sizer.

It is another object of the present invention to provide a cylinder sizer that enlarges at least a portion of chambers of a cylinder for a gun to a predetermined size.

It is yet another object of the present invention to provide a method of enlarging at least a portion of chambers of a cylinder for a gun.

To achieve the foregoing objects, the present invention is a cylinder sizer including a base, a slide cooperating with the base and movable relative thereto and a lock fastener to extend through a central aperture of a cylinder for a gun and engaging the slide. The cylinder sizer also includes an alignment member to extend through a chamber of the cylinder and operatively engaging the base for aligning the cylinder relative to the base. The cylinder sizer further includes a cutting tool to extend into the chamber of the cylinder and operatively engaging the base for enlarging at least a portion of the chamber.

Additionally, the present invention is a method of enlarging at least a portion of a chamber of a cylinder for a gun. The method includes the steps of providing a cylinder for a gun and providing a cylinder sizer having base, a slide cooperating with the base and movable relative thereto, and a lock fastener to extend through a central aperture of a cylinder for a gun and engaging the slide. The method also includes the steps of providing an alignment member and extending the alignment member through a chamber of the cylinder and engaging the base and aligning the cylinder relative to the base. The method further includes the steps of providing a cutting tool and extending the cutting tool into the chamber of the cylinder and engaging the base and enlarging a least a portion of the chamber of the cylinder to a predetermined size.

One advantage of the present invention is that a cylinder sizer is provided for enlarging at least a portion of chambers of a cylinder for a gun. Another advantage of the present invention is that the cylinder sizer enlarges either the throat portion or the entire chamber of a cylinder of a gun to a non-standard predetermined size. Yet another advantage of the present invention is that the cylinder sizer enlarges a diameter of at least a portion of the chambers of a standard cylinder for a gun to accept a non-standard or special bullet of the cartridge. Still another advantage of the present invention is that the cylinder sizer enlarges the chambers of a standard cylinder for a gun in a true or accurate manner. A further advantage of the present invention is that a method is provided of enlarging chambers of a cylinder for a gun to a predetermined size.

Other objects, features and advantages of the present invention will be readily appreciated, as the same becomes better understood, after reading the subsequent description when considered in connection with the accompanying drawings.

DESCRIPTION OF THE PREFERRED EMBODIMENT(S)

Figure 1:
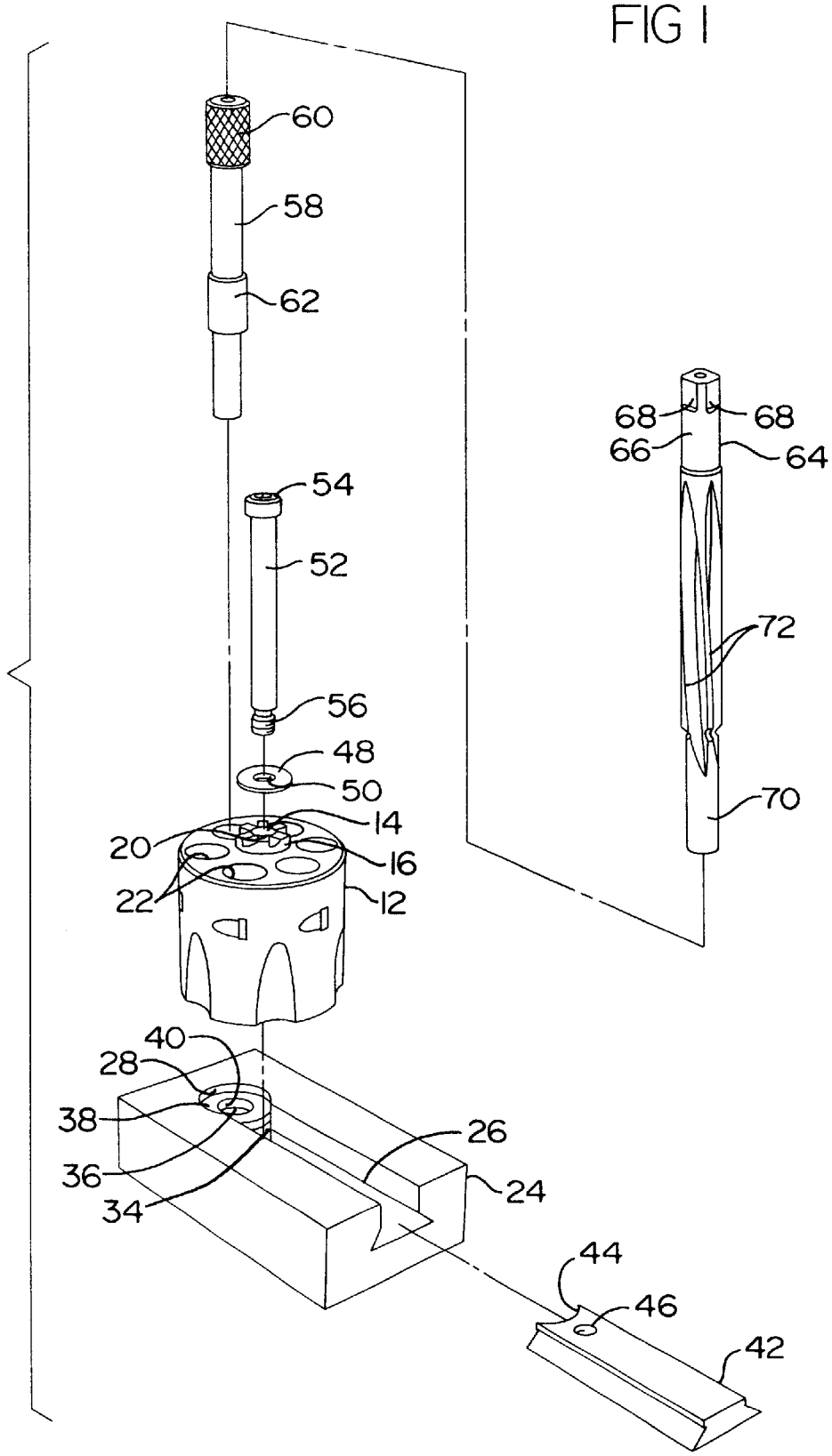
FIG. 1 is an exploded perspective view of a cylinder sizer, according to the present invention, illustrated in operational relationship with a cylinder for a gun.

Referring now to the drawings and in particular to FIG. 1, one embodiment of a cylinder sizer 10, according to the present invention, is illustrated in operational relationship with a cylinder 12 for a gun (not shown) such as a revolver. The cylinder 12 is generally cylindrical in shape and has a generally circular cross-sectional shape. The cylinder 12 is made of a metal material such as steel. The cylinder 12 extends axially and has a central aperture 14 extending axially therethrough. The cylinder 12 has a first mounting portion 16 surrounding the central aperture 14 on one axial end thereof. The first mounting portion 16 extends axially and has a generally cylindrical shape with a generally circular cross-section. The cylinder 12 also has a second mounting portion 18 surrounding the central aperture 14 at the other axial end thereof. The second mounting portion 18 extends axially and has a generally cylindrical shape with a generally circular cross-section. The first mounting portion 16 may include a plurality of recesses 20 for cooperating with corresponding members (not shown) on the gun. It should be appreciated that the first mounting portion 16 may be optional or have another configuration for allowing the cylinder to be mounted to the gun as is known in the art.

The cylinder 12 also includes a plurality of chambers 22 disposed circumferentially about the central aperture 14. The chambers 22 extend axially through the cylinder 12 and have a generally circular cross-sectional shape. The chambers 22 have a rim portion 23a at one axial end for a rim (not shown) of a cartridge case (not shown) for a cartridge (not shown). The chambers 22 have a throat portion 23b at the other axial end opposite the rim portion 23a through which a bullet (not shown) of the cartridge travels. The chambers 22 are of a predetermined size such as 0.357 inches for the bullet of a cartridge of a standard size as is known in the art. It should be appreciated that the cylinder 12 may be for a single action or double action revolver type gun as is known in the art. It should also be appreciated that the cylinder 12 and cartridge are conventional and known in the art.

Figure 2:
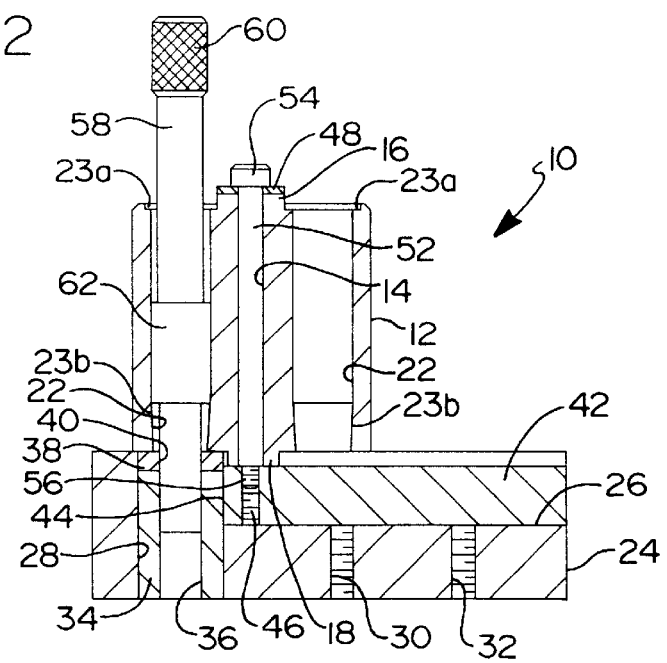
FIG. 2 is a fragmentary elevational view of the cylinder sizer of FIG. 1 illustrating a first operational state.
Figure 3:
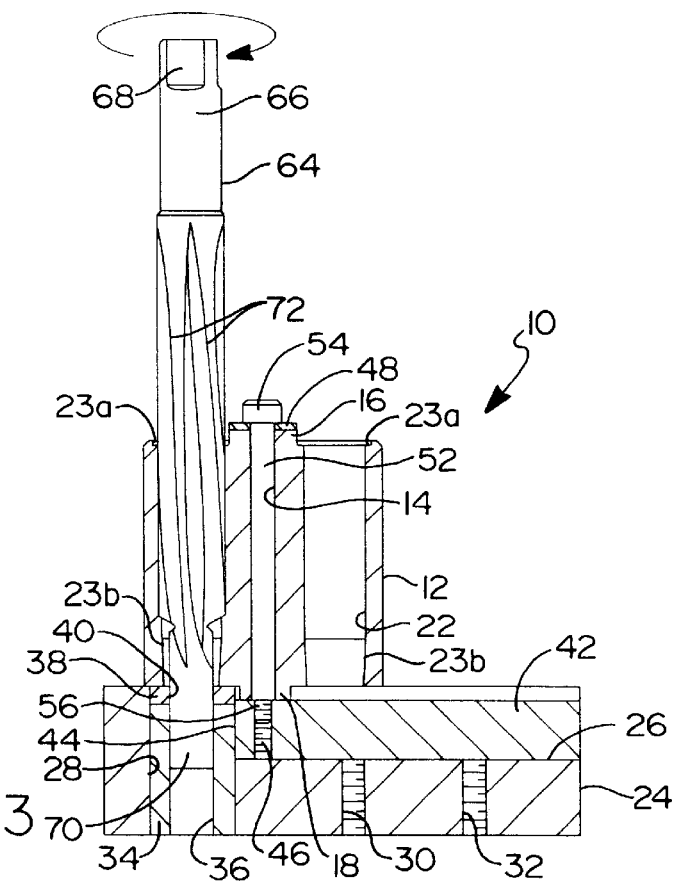
FIG. 3 is a view similar to FIG. 2 illustrating a second operational state of the cylinder sizer of FIG. 1.

Referring to FIGS. 1 through 3, the cylinder sizer 10, according to the present invention, is used to enlarge the diameter of at least a portion or the entire axial length of the chambers 22 of the cylinder 12. Preferably, the cylinder sizer 10 is used to enlarge the diameter of the throat portion 23b of the chambers 22. The cylinder sizer 10 includes a base 24 for resting on support surface. The base 24 is generally rectangular in shape and made of a metal material such as steel. The base 24 includes a slide-way 26 extending longitudinally inwardly from one end thereof. The slide-way 26 has a generally dove-tail cross sectional shape. The base 24 also includes a bushing aperture 28 extending therethrough perpendicular to the slide-way 26 and at one end thereof. The base 24 includes a first threaded aperture 30 extending from a bottom thereof and into the slide-way 26. The first threaded aperture 30 is spaced longitudinally from the bushing aperture 28. The base 24 includes a second threaded aperture 32 extending from the bottom thereof and into the slide-way 26. The second threaded aperture 32 is spaced longitudinally between the first threaded aperture 30 and the end of the base 24.

The cylinder sizer 10 includes a pilot bushing 34 extending through the bushing aperture 28 and secured therein by suitable means such as an interference fit. The pilot bushing 34 extends axially and is generally tubular in shape with a generally circular cross-sectional shape. The pilot bushing 34 has an aperture 36 extending axially therethrough. The pilot bushing 34 is disposed in the bushing aperture 28 and extends from the bottom of the base 24 into the slide-way 26 a predetermined distance. The pilot bushing 34 is made of a metal material such as steel. It should be appreciated that the pilot bushing 34 terminates prior to the top of the base 24.

The cylinder sizer 10 may include a washer 38 disposed on top of the pilot bushing 34. The washer 38 is made of a metal material that is softer than the metal material of the pilot bushing 34, preferably such as brass. The washer 38 is generally circular in shape and has the same diameter as the pilot bushing 34. The washer 38 has an aperture 40 extending axially therethrough. It should be appreciated that the washer 38 interacts with the cylinder 12 to prevent damage or wear to the pilot bushing 34.

The cylinder sizer 10 includes a slide 42 disposed in the slide-way 26 for sliding movement therealong. The slide 42 extends longitudinally and has a cross-sectional shape complementary to the slide-way 26, preferably a generally dove-tail cross-sectional shape. The slide 42 includes an arcuate or circular recess 44 at one longitudinal end that is complementary to the outer periphery of the pilot bushing 34. The slide 42 also has a threaded aperture 46 extending generally perpendicularly therethrough and spaced a distance from the recess 44. The slide 42 is made of a metal material such as steel. It should be appreciated that the slide 42 is movable or slidable in the slide-way 26 relative to the pilot bushing 34. It should also be appreciated that the slide 42 may be removed from the base 24 by sliding the slide 42 longitudinally relative to the pilot bushing 34. It should also be appreciated that the dove-tail configuration prevents the slide 42 from exiting the slide-way 26 through a top of the base 24.

The cylinder sizer 10 includes a plurality of fasteners 47 to threadably engage the slide 42. The fasteners 47 are preferably set screws. The fasteners 47 extend axially and are generally cylindrical in shape with a generally circular cross-sectional shape. The fasteners 47 are made of a metal material such as steel. The fasteners 47 are threaded and threadably engage the first and second threaded apertures 30 and 32 in the base 24. It should be appreciated that the fasteners 47 are engageable with the slide 42 to secure the slide 42 from movement in the slide-way 26.

The cylinder sizer 10 may include a washer 48 disposed on top of the first mounting portion 16 of the cylinder 12. The washer 48 is made of a metal material that is softer than the metal material of the first mounting portion 16, preferably such as brass. The washer 48 is generally circular in shape and has the same diameter as the first mounting portion 16. The washer 48 has an aperture 50 extending axially therethrough. It should be appreciated that the washer 48 interacts with the first mounting portion 16 of the cylinder 12 to prevent damage or wear to the first mounting portion 16.

The cylinder sizer 10 may also include another or second washer (not shown) disposed between the washer 48 and the first mounting portion 16. The second washer is made of a flexible material such as urethane to accommodate the shape of the first mounting portion 16. The second washer is generally circular in shape and has the same diameter as the first mounting portion 16. The second washer has an aperture extending axially therethrough. It should be appreciated that the second washer is sandwiched between the washer 48 and first mounting portion 16 and interacts with the first mounting portion 16 of the cylinder 12 to prevent damage or wear to the first mounting portion 16. It should also be appreciated that the second washer is used with double action type cylinders.

The cylinder sizer 10 includes a lock fastener 52 to removably secure the cylinder 12 to the slide 42. The lock fastener 52 extends axially and has a head portion 54 and a threaded end portion 56. The lock fastener 52 extends through the aperture 50 of the washer 48 and the central aperture 14 of the cylinder 12 and engages the threaded aperture 46 in the slide 42. The lock fastener 52 is made of a metal material such as steel. It should be appreciated that the head portion 54 of the lock fastener 52 abuts the washer 48.

Referring to FIG. 2, the cylinder sizer 10 includes a pilot or alignment pin 58 for insertion in the chamber 22 of the cylinder 12 to provide true or accurate alignment between the chamber 22 and the pilot bushing 34. The alignment pin 58 extends axially and is generally cylindrical in shape with a generally circular cross-sectional shape. The alignment pin 58 is made of a metal material such as steel. The alignment pin 58 has a head portion 60 at one end. The head portion 60 may be knurled for easier grasping by an operator. The alignment pin 58 also has an alignment portion 62 extending radially and axially and spaced axially from the head portion 60. The alignment portion 62 is of a predetermined diameter complementary to the diameter of the chamber 22. The end of the alignment pin 58 is of a predetermined diameter complementary to the diameter of the aperture 36 of the pilot bushing 34. The end of the alignment pin 58 extends through the throat portion 23b of the chamber 22 and is disposed in the aperture 36 of the pilot bushing 34. It should be appreciated that once the chamber 22 is located relative to the pilot bushing 34, the slide 42 is locked into place with the fasteners 47 and the lock fastener 52 is tightened and secured in place.

The cylinder sizer 10 includes a cutting tool such as a reamer 64 for enlarging the diameter of at least a portion of the chambers 22 of the cylinder 12. The reamer 64 extends axially and is generally cylindrical in shape with a generally circular cross-sectional shape. The reamer 64 is made of a metal material such as steel. The reamer 64 has a head portion 66 at one end. The head portion 66 may have opposed planar or flat portions 68 extending axially on an outer surface thereof to allow an operator to turn the reamer 64 with a tool such as a wrench (not shown). The reamer 64 has a locating portion 70 at the other end opposite the head portion 66. The locating portion 70 is of a predetermined diameter complementary to the diameter of the aperture 36 of the pilot bushing 34. The locating portion 70 of the reamer 64 is disposed in the aperture 36 of the pilot bushing 34. The reamer 64 also has a plurality of external cutting flutes 72 extending radially outwardly and axially between the head portion 66 and locating portion 70. The cutting flutes 72 are disposed circumferentially about the reamer 64 to form a predetermined diameter greater than the diameter of at least a portion of the chamber 22 to allow enlargement thereof. The flutes 72 may be used to remove material from the throat portion 23b to enlarge its diameter or to remove material from the entire axial length of the chamber 22 to enlarge its diameter. It should be appreciated that the reamer 64 is rotated to allow the cutting flutes 72 to remove material from walls forming the chambers 22 to enlarge the diameter thereof. It should also be appreciated that the reamer 64 may be used to enlarge the diameter of the chamber 22 along its entire axial length or partially along its length.

In operation of the cylinder sizer 10, the cylinder 12 is placed on the slide 42 with the washer 48 adjacent the first mounting portion 16. The lock fastener 52 is extended through the aperture 50 of the washer 48 and the central aperture 14 of the cylinder 12 and rotated to threadably engage the threaded portion 56 with the threaded aperture 46 in the slide 42 which is disposed in the slide-way 26 of the base 24. The lock fastener 52 is not fully tightened and the slide 42 is moved in the slide-way 26 such that the recess 44 abuts the pilot bushing 34 as illustrated in FIG. 2. The alignment pin 58 is inserted in one of the chambers 22 and disposed in the aperture 36 of the pilot bushing 34 to align the chamber 22 with the pilot bushing 34. The slide 42 is locked into place in the slide-way 26 with the fasteners 47 and the lock fastener 52 is fully tightened. The alignment pin 58 is then removed from the chamber 22. Finally, the throat portion 23b or the entire chamber 22 is carefully enlarged with the reamer 64 by hand reaming with the use of cutting oil and the process is repeated for each chamber 22 as illustrated in FIG. 3. For this process, the slide 42 remains fixed relative to the base 24 and the lock fastener 52 is loosened. The cylinder 12 is rotated and advanced to the next chamber 22. The alignment pin 58 may be used again to locate the chamber 22 relative to the pilot bushing 34. Once advanced, the lock fastener 52 is fully tightened and the throat portion 23b or the entire chamber 22 enlarged. It should be appreciated that the chamber 22 is enlarged in a true or accurate manner.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cylinder sizer comprising:
   a base;
   a slide cooperating with said base and movable relative thereto;
   a lock fastener to extend through a central aperture of a cylinder for a gun and engaging said slide;
   an alignment member to extend through a chamber of the cylinder and operatively engaging said base for aligning the cylinder relative to said base; and
   a cutting tool to extend into the chamber of the cylinder and operatively engaging said base for enlarging at least a portion of the chamber of the cylinder.

2. A cylinder sizer as set forth in claim 1 wherein said base includes a slide-way and said slide being disposed in said slide-way.

3. A cylinder sizer as set forth in claim 2 wherein said base includes a bushing aperture extending therethrough at one end of said slide-way.

4. A cylinder sizer as set forth in claim 3 including a pilot bushing disposed in said bushing aperture.

5. A cylinder sizer as set forth in claim 2 wherein said base includes at least one threaded aperture extending therethrough and communicating with said slide-way.

6. A cylinder sizer as set forth in claim 1 including a washer disposed about said locking fastener and engageable with said locking fastener.

7. A cylinder sizer as set forth in claim 4 including a washer disposed adjacent said pilot bushing and engageable with the cylinder.

8. A cylinder sizer as set forth in claim 1 wherein said alignment member has an alignment portion extending axially and radially outwardly to engage walls of the chamber.

9. A cylinder sizer as set forth in claim 1 wherein said cutting tool has a plurality of cutting flutes extending axially and radially outwardly to engage walls of the chamber.

10. A cylinder sizer as set forth in claim 4 wherein said slide includes a recess engageable with said pilot bushing.

11. A cylinder sizer comprising:
    a base having a slide-way therein, a bushing aperture extending through said base and communicating with said slide-way, and a pilot bushing disposed in said bushing aperture;
    a slide disposed in said slide-way of said base and movable relative thereto;
    a lock fastener to extend through a central aperture of a cylinder for a gun and engaging said slide;
    an alignment member to extend through a chamber of the cylinder and engageable with said pilot bushing for aligning the chamber relative to said pilot bushing; and a cutting tool to extend into the chamber of the cylinder and engageable with pilot bushing for enlarging at least a portion of the chamber of the cylinder.

12. A method of enlarging at least a portion of a chamber of a cylinder, said method comprising the steps of:

providing a cylinder for a gun;

providing a cylinder sizer having a base, a slide cooperating with the base and movable relative thereto and a lock fastener to extend through a central aperture of a cylinder for a gun to engage the slide;

providing an alignment member and extending the alignment member through a chamber of the cylinder and operatively engaging the base and aligning the cylinder relative to the base; and providing a cutting tool and extending the cutting tool into the chamber of the cylinder and operatively engaging the base and enlarging at least a portion of the chamber of the cylinder to a predetermined size.

13. A method as set forth in claim 12 including the step of providing the slide with a recess at one end and abutting the slide against the pilot bushing to receive a portion of the pilot bushing in the recess.

14. A method as set forth in claim 12 including the step of providing a washer and disposing the washer against the pilot bushing.

15. A method as set forth in claim 11 including the step of fixing the slide relative to the base before said step of providing the cutting tool.

16. A method as set forth in claim 11 including the step of loosening the lock fastener and advancing the cylinder to the next chamber after said step of providing the cutting tool.

17. A method as set forth in claim 16 including the step of extending the cutting tool into the next chamber of the cylinder and operatively engaging the base and enlarging the next chamber of the cylinder to a predetermined size.

18. A method as set forth in claim 11 including the step of removing the alignment pin from the chamber after said step of aligning.

19. A method as set forth in claim 11 including the step of rotating the cutting tool to enlarge the diameter of the chamber.

20. A cylinder sizer comprising:

a base having a slide-way therein, a bushing aperture extending through said base at one end of said slide-way and communicating with said slide-way, and a pilot bushing disposed in said bushing aperture and having a pilot aperture extending therethrough;

a slide disposed in said slide-way of said base and movable relative thereto and having a recess to receive said pilot bushing and a threaded aperture;

a lock fastener to extend through a central aperture of a cylinder for a gun and threadably engaging said threaded aperture of said slide;

an alignment member to extend through a chamber of the cylinder and having a locating portion disposed in said pilot aperture of said pilot bushing and an alignment portion extending radially to engage walls of the chamber for aligning the chamber relative to said pilot bushing; and a reamer to extend into the chamber of the cylinder and having an end portion disposed in said pilot aperture of said pilot bushing and having a plurality of cutting flutes engageable with the walls of the chamber for removing material therefrom for enlarging at least a portion of the chamber of the cylinder.

* * * * *